United States Patent
Lettkeman

(10) Patent No.: US 9,722,296 B2
(45) Date of Patent: *Aug. 1, 2017

(54) CLAMP DEVICE FOR MOUNTING ANTENNA TO RAIL

(71) Applicant: DISH NETWORK L.L.C., Englewood, CO (US)

(72) Inventor: David Michael Lettkeman, Parker, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,308

(22) Filed: Mar. 29, 2016

(65) Prior Publication Data
US 2016/0211568 A1   Jul. 21, 2016

Related U.S. Application Data

(63) Continuation of application No. 13/968,427, filed on Aug. 16, 2013, now Pat. No. 9,343,799.
(Continued)

(51) Int. Cl.
*H01Q 1/12*   (2006.01)
*F16M 13/02*   (2006.01)
(Continued)

(52) U.S. Cl.
CPC ............. *H01Q 1/125* (2013.01); *F16B 2/065* (2013.01); *F16M 13/022* (2013.01); *H01Q 1/12* (2013.01);
(Continued)

(58) Field of Classification Search
CPC .. H01Q 1/12; H01Q 1/22; H01Q 1/24; H01Q 1/125; H01Q 3/02; F16M 13/02; F16M 13/022
(Continued)

(56) References Cited

U.S. PATENT DOCUMENTS 3,604,676 A * 9/1971 Weber .................. F16L 3/1075
248/231.41
4,063,700 A * 12/1977 Brewer ............... F01N 13/1805
24/277
(Continued)

FOREIGN PATENT DOCUMENTS

EP   2309832 A1   4/2011

OTHER PUBLICATIONS

Canadian Office Action, May 6, 2016, English, 4 pages.
(Continued)

*Primary Examiner* — Tan Le
(74) *Attorney, Agent, or Firm* — Wash Park IP Ltd.; John T. Kennedy

(57) ABSTRACT

A device for mounting an antenna to a rail is provided. The device includes a first clamp member and a second clamp member. The first clamp member includes a planar base plate having a first surface and a second surface. The planar base plate has at least two slots spaced apart on a longitudinal axis. At least two extension sections extend from the first surface of the planar base plate and being spaced apart along the longitudinal axis and closer to a center than the at least two slots. Each extension section includes a patterned cutout area configured to receive the rail. A plurality of threaded fasteners extend from the first surface of the planar base plate and being positioned outside the patterned cutout area along a transverse axis perpendicular to the longitudinal axis. The second clamp member has a plurality of through-holes configured to receive the plurality of threaded fasteners and a planar surface facing toward the first surface of the first clamp member.

20 Claims, 9 Drawing Sheets

Related U.S. Application Data

(60) Provisional application No. 61/684,071, filed on Aug. 16, 2012.

(51) Int. Cl.
*F16B 2/06* (2006.01)
*H01Q 1/22* (2006.01)
*H01Q 1/24* (2006.01)

(52) U.S. Cl.
CPC .......... *H01Q 1/1228* (2013.01); *F16M 13/02* (2013.01); *H01Q 1/22* (2013.01); *H01Q 1/24* (2013.01); *Y10T 29/49947* (2015.01)

(58) Field of Classification Search
USPC .............. 248/65, 68.1, 218.4, 226.11, 228.4, 248/229.13, 229.23, 231.51, 511, 539, 248/534; 343/718, 878, 882, 890, 892
See application file for complete search history.

(56) References Cited

U.S. PATENT DOCUMENTS

| | | |
|---|---|---|
| 4,595,165 A | 6/1986 | Klingensmith |
| 6,283,425 B1* | 9/2001 | Liljevik ................ F16M 13/02 248/218.4 |
| 9,343,799 B2* | 5/2016 | Lettkeman ............... H01Q 1/12 |

OTHER PUBLICATIONS

Response to Canadian Office Action, Nov. 6, 2016, English, 11 pages.
EPO Search Report, Feb. 29, 2016, English, 9 pages.
EPO Comm. Per Rule 70-2, English, 1 page.
Response to EPO Search Report, Sep. 23, 2016, English, 40 pages.

* cited by examiner

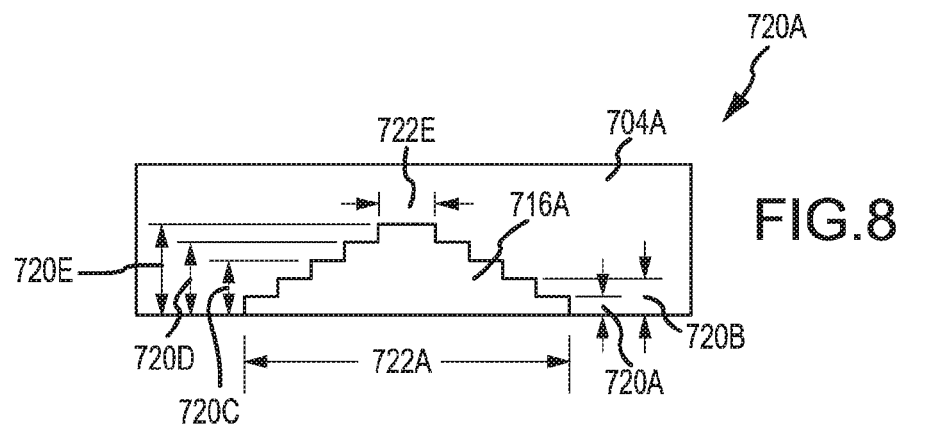
FIG.8
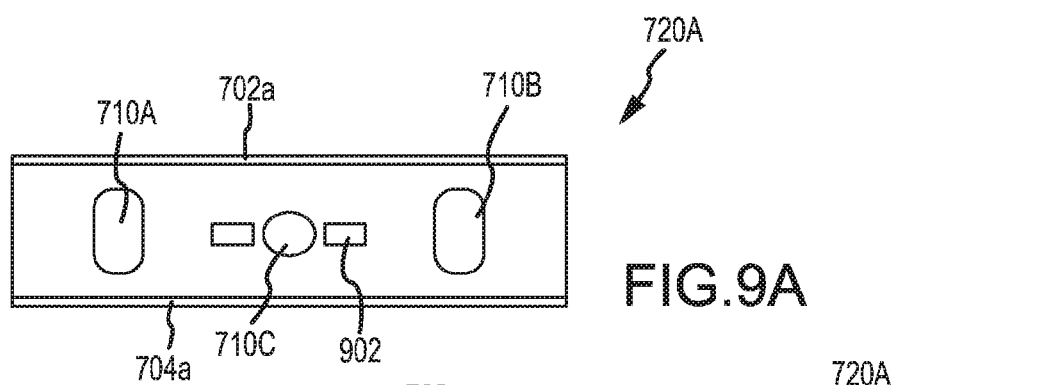
FIG.9A
FIG.9B
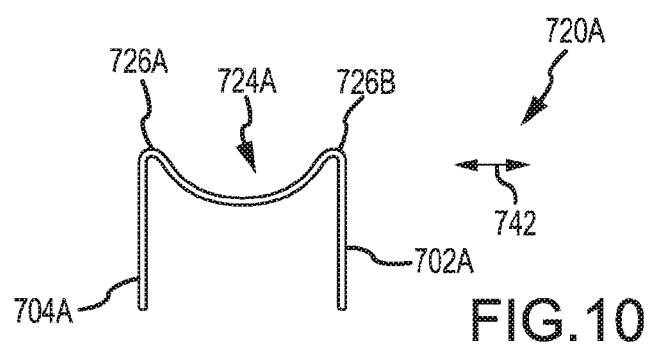
FIG.10

CLAMP DEVICE FOR MOUNTING ANTENNA TO RAIL

CROSS-REFERENCE TO RELATED APPLICATION

The present application is a continuation of U.S. patent application Ser. No. 13/968,427, entitled "Clamp Device for Mounting Antenna to Rail", filed Aug. 16, 2013 which claims priority to U.S. Provisional Application No. 61/684,071, entitled "Clamp Device for Mounting Antenna to Rail", filed Aug. 16, 2012, the disclosures of both are incorporated herein by reference in their entirety.

TECHNICAL FIELD

The present invention generally relates to clamp device. More specifically, the invention relates to a clamp device that firmly attaches an antenna to a rail.

BACKGROUND

With the introduction of direct-to-home satellite broadcast television systems, such as Direct Broadcast Satellite (DBS) systems, a multitude of television programs, audio channels, and the like previously unknown with terrestrial ("over-the-air") broadcast systems was made accessible to millions of potential subscribers. One aspect of such systems that allows such wide accessibility is the use of a small (e.g., less than one meter in diameter) and inexpensive satellite antenna, or "dish". To effectively employ such an antenna, a subscriber merely provides direct line-of-sight between the dish and the satellites of interest, and supplies a stable mounting platform or base to which the antenna is mounted, such as the exterior of the subscriber's home. The latter requirement helps prevent the antenna from becoming misaligned or misdirected as the result of strong winds or other meteorological conditions, which may cause disruption of the satellite signal carrying the programming.

In many cases, a subscriber may determine that a rail or similarly-configured structure conveniently located in the vicinity of the proposed location for the receiver is desirable as a mounting base for the antenna. While such a rail may provide a stable structure to which an antenna may be mounted, the subscriber may desire to attach the antenna thereto without drilling holes in the rail, or otherwise significant damage on the rail. Further, the diameter of each rail potentially utilized as an antenna mounting base may vary widely from one subscriber premises to another, thus rendering the ability to provide a single attachment structure for mounting an antenna to such a rail.

A first type of antenna mount has been disclosed in U.S. Pat. No. 8,081,139, issued on Dec. 20, 2011, by Jason S. Schmidt, David Lettkeman and Eric Bolze, entitled "Structures and Methods for Mounting an Antenna." The antenna mount includes individual three components, i.e. first, second and third components. One rail is held between the first component and the third component, and another rail is held between the second component and the third component. A foot section for mounting to an antenna is attached to the third component on an opposite side from the rails. This antenna mount allows to attach the antenna to the rails. The antenna is relatively large in size and uses more materials in fabricating the first, second, and third components and thus is relatively expensive.

A second type of antenna mount has been disclosed in U.S. patent application Ser. No. 20110083399, filed on Oct. 13, 2009, by David Lettkeman and Kevin S. Holle, entitled "Structures and Methods for Mounting An Object." This type of antenna mount uses a chain to mount the antenna to a rail. Although the second type of antenna mount is simpler than the first type of antenna mount, the second type of antenna mount is still relatively complicated and expensive.

It is desirable to design simpler clamp devices for attaching an antenna to a rail with reduced product cost. Thus, there remains a need for developing alternative clamp devices.

SUMMARY

Embodiments described herein may provide clamp devices for mounting an antenna to a rail. The clamp devices include two clamp components or two clamp members. The clamp devices are relatively small in size compared to the first type of antenna mount disclosed in U.S. Pat. No. 8,081,139. The smaller sizes may help reduce the use of materials and thus may reduce product cost. The clamp devices may be easier for mounting as there are only two components, rather than three components as disclosed in the U.S. Pat. No. 8,081,139.

In one embodiment, a device for mounting an antenna to a rail is provided. The device includes a first clamp member and a second clamp member. The first clamp member includes a planar base plate having a first surface and a second surface. The planar base plate has at least two slots spaced apart on a longitudinal axis. The first clamp member also includes at least two extension sections extending from the first surface of the planar base plate and being spaced apart along the longitudinal axis and closer to a center than the at least two slots. Each extension section includes a patterned cutout area configured to receive the rail. The planar base plate further includes a plurality of threaded fasteners extending from the first surface of the planar base plate and being positioned outside the patterned cutout area along a transverse axis perpendicular to the longitudinal axis. The second clamp member includes a plurality of through-holes configured to receive the plurality of threaded fasteners. The second clamp member has a planar surface facing toward the first surface of the first clamp member to contact the rail when the rail is held in the patterned cutout areas of the at least two extension sections.

In another embodiment, a device for mounting an antenna to a rail is provided. The device includes a first clamp component having a first sidewall and a second sidewall coupled by a first middle portion, the first and second sidewalls extending from two opposing ends of the middle portion such that the first sidewall is opposed to the second sidewall. The first and second sidewalls include a first and a second cutout area configured to fit to a first portion of the rail. The device also includes a second clamp component having a third sidewall and a fourth sidewall coupled by a second middle portion, the third and fourth sidewalls extending from two opposing ends of the second middle portion such that the third sidewall is opposed to the fourth sidewall. The third and fourth sidewalls includes a third and a fourth cutout area being configured to fit to a second portion of the rail. The first clamp component and the second clamp component are arranged to be opposite to each other such that the rail is held in the cutout areas of the first and second components. Each of the first and second middle portions has a first through-hole in a center, a second through-hole and a third through-hole on each side of the first through-hole. The through-holes are spaced apart along a longitudinal axis. The second and third through-holes are configured to attach the first clamp component to the second clamp component.

In yet another embodiment, a method for mounting an object to a rail is provided. The method includes providing a first clamp member and a second clamp member. The first clamp member includes a planar base plate with at least two extension sections extending from a first surface of the planar base plate and being spaced apart along a longitudinal axis. Each extension section comprising a patterned cutout area configured to receive the rail. The base plate has a plurality of threaded fasteners extending from the first surface of the planar base plate and being positioned outside the patterned cutout area along a transverse axis perpendicular to the longitudinal axis. The base plate has at least two slots for mounting the object. The second clamp member has a plurality of through-holes configured to receive the plurality of threaded fasteners. The second clamp member has a planar surface facing toward the first surface of the first clamp member to contact the rail when the rail is held in the patterned cutout areas of the at least two extension sections. The method also includes positioning the first clamp member along the rail and attaching the second clamp member to the first clamp member with the rail held in the cutout areas. The method further includes mounting a foot section to the slots of the first clamp member; and mounting the object to the foot section.

In still yet another embodiment, a method for mounting an object to a rail is provided. The method includes providing a first clamp component, a second clamp component, a third clamp component, and a fourth clamp component. The method also includes positioning the first clamp component and the second clamp component at a first location of the rail and attaching the first and second clamp components to the rail. The method further includes positioning the third clamp component and the fourth clamp component at a second location of the rail. The third clamp component is on a first side of the rail as the first clamp component and the fourth clamp component being on a second opposing side of the rail as the second clamp component. The method also includes attaching the third and fourth clamp components to the rail, mounting a foot section to the first and third clamp components, and mounting the object to the foot section.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

FIG. 8 is a top or bottom view of a clamp component of the second clamp device of FIG. 7A or 7B.

FIG. 9A is a bottom view of the clamp component of FIG. 7A or 7B.

FIG. 9B is a bottom view of the clamp component of FIG. 7A or 7B with a fastener in place.

FIG. 10 is a side view of the clamp component of FIG. 8.

DETAILED DESCRIPTION

Figure 1:
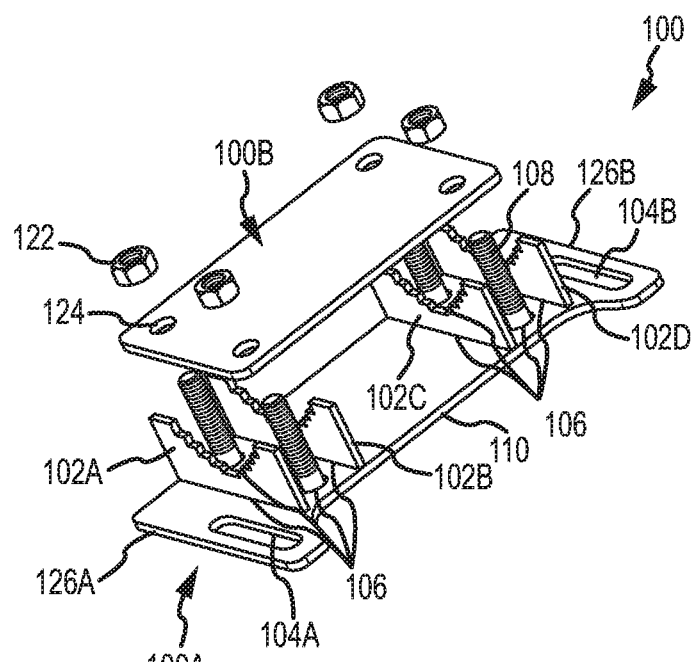
FIG. 1 illustrates a back perspective view of a first clamp device prior to assembly in one embodiment.

The present disclosure may be understood by reference to the following detailed description, taken in conjunction with the drawings as briefly described below. It is noted that, for purposes of illustrative clarity, certain elements in the drawings may not be drawn to scale.

This disclosure provides a clamp device for mounting an antenna to a rail. Two clamp devices are presented. A first clamp device includes a first clamp member and a second clamp member, and is configured or adapted to engage or hold a rail between the first and second clamp members. The first clamp member of the first clamp device includes at least two extension sections with patterned cutout areas that have stepped patterns matched to the rail in various sizes. The first clamp member is also configured to attach to an antenna. The second clamp member is a plate with through-holes configured to attach to the first clamp member.

A second clamp device includes four substantially identical clamp components. Each clamp component includes a cutout area that has stepped patterns matched to a rail in various sizes. The clamp device assembles four clamp components of the same type for attaching to the rail and an antenna. Two of the four clamp components are attached to the rail at a first location and another two of the four clamp components are attached to the rail at a second location spaced apart from the first location. A foot section for mounting the antenna may be attached to the two clamp components on the same side of the rail such that the foot section is substantially parallel to the rail. The clamp components also include an attachment mechanism to both the antenna and the rail.

The second clamp device may be simpler for fabrication because only one clamp component needs to be fabricated. The second clamp device may also be more flexible for mounting to both a vertically oriented rail and a horizontally oriented rail than the firs clamp device.

FIG. 1 illustrates a back perspective view of a first clamp device in an embodiment. In this embodiment, the first clamp device has its back side for attaching to a rail and its front side for attaching to an antenna mast. For example, FIGS. 5B and 6B illustrate a front view of the first clamp device. The first clamp device 100 includes a first clamp member 100A and a second clamp member which is a compression plate 100B. The compression plate 100B has a substantially rectangular shape and includes four through holes 124 near four corners of the rectangular compression plate. The first clamp member 100A includes a planar base plate 112 having two elongated slots 104A and 104B near two opposing edges 126A and 126B, respectively. The slots may be used to attach a foot section for an antenna to the base plate 112. The first clamp member 100A may also include four extension sections 102A-D extending from the same surface of the base plate 112. Each extension section has a patterned cutout area configured to receive a rail. Between a first pair of extension sections 102A-B, two threaded fasteners 108 may extend from the base plate 112 from the same side as the extension sections. Another two threaded fasteners 108 may be positioned between a second pair of extension sections 102C-D and extend from the base plate 112. The threaded fasteners 108 may be aligned with the through-holes of the compression plate 100B such that the first and second clamp member may be attached by attachment mechanism 122, such as threaded nuts. As shown, clamp member 100A has a curved edge 110 from the front.

Figure 2:
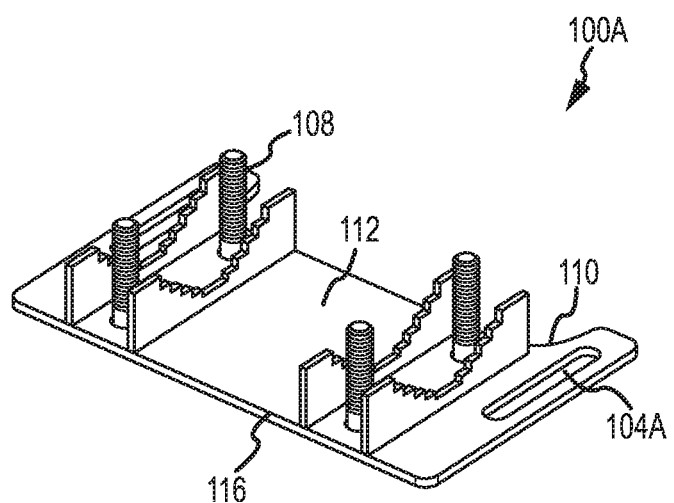
FIG. 2 is a back perspective view of a first clamp member of the first clamp device of FIG. 1.
Figure 3:
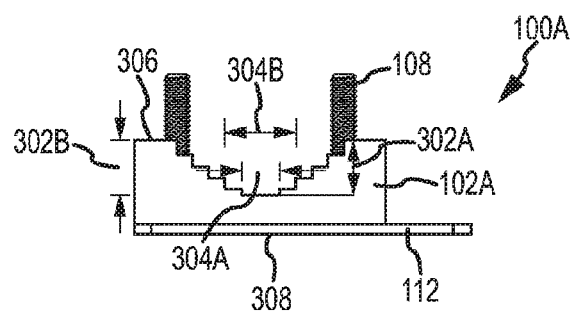
FIG. 3 is a top or bottom view of the first clamp member of FIG. 2.

FIG. 2 is a back perspective view of the first clamp member of FIG. 1 from a different angle than FIG. 1. As shown, clamp member 100A has a substantially straight edge 116 from the back. FIG. 3 is a top or bottom view of the first clamp member of FIG. 2. Note that the threaded fasteners 108 extend above the extension section 102A to provide space for fitting to the rail. There may be multiple steps in the cutout area. A bottom step has the deepest depth 302A with the smallest width 304A, and is matched to a first size of a rail. A second step from the bottom has a larger width 304B than the 304A, and is matched to a second size of a rail. Similarly, a third step has a even larger width than the width 304B. The steps may vary in depth and width to match to rails of various sizes.

Figures 4A, 4B:
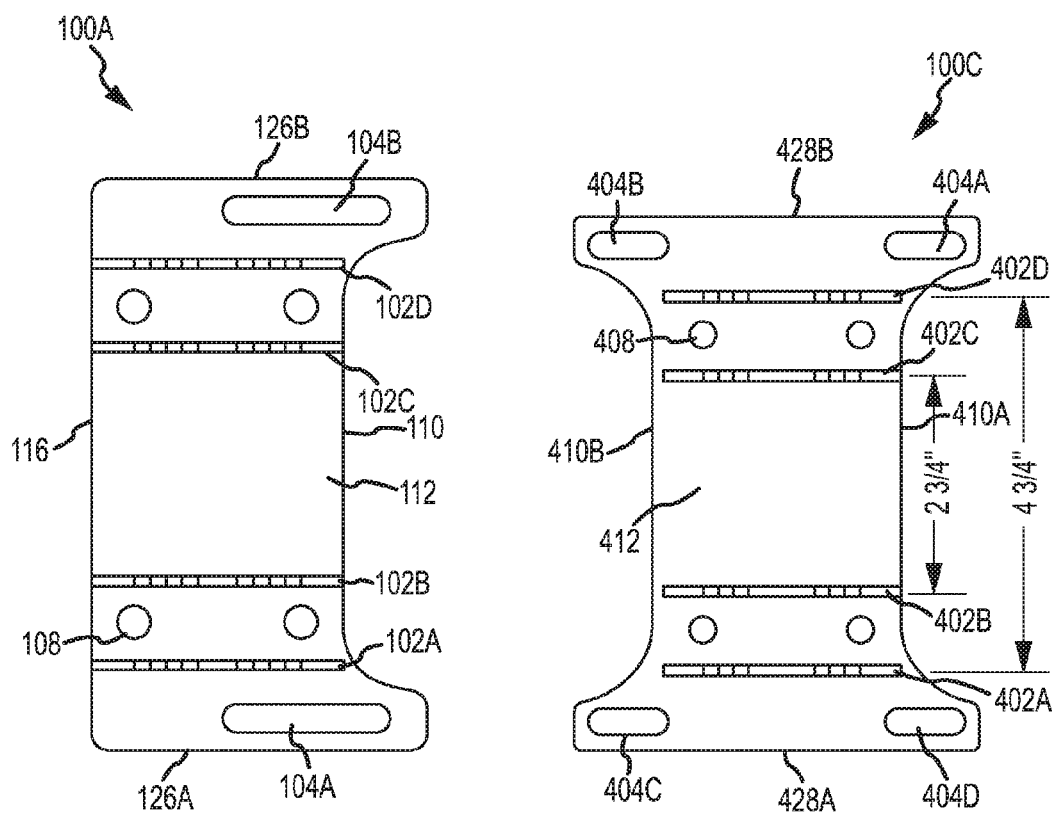
FIG. 4A is a back view of the first clamp member of FIG. 2 in a first embodiment.
FIG. 4B is a back view of the first clamp member of FIG. 2 in a second embodiment.

FIG. 4A is a back view of the first clamp member 100A in a first embodiment. The base plate 112 is contoured by two opposing edges 126A and 126B connected to the substantially straight edge 116 and the curved edge 110. The curved edge 110 may be concaved to reduce material usage compared to a base plate with four substantially straight edges, which may reduce product cost. The slot 104A may be arranged between the extension section 102A and the respective edge 126A, and the slot 126B of the base plate 112 may be arranged between the extension 102D and the respective edge 126B. In an alternative embodiment, the extension sections 102B and 102C may be removed. In another embodiment, the extension sections 102A and 102D may be removed. It will be appreciated by those skilled in the art that the number of threaded fasteners 108 may also vary.

In a particular embodiment, the base plate 112 of the first clamp member 100A may be approximately 6.75 inches long, the 0.125 inches thick, and 3 inches wide. The extension sections may be 0.85 inches tall. The compression plate 100B may be approximately 6.75 inches long, 3 inches wide, and 0.125 inches thick.

FIG. 4B is a back view of the first clamp member in a second embodiment. An alternative clamp member 100C that replaces clamp member 100A may include four elongated slots near four corners and may be contoured by two substantially straight edges 428A and 428B that are opposed to each other and two curved edges 410A and 410B that are opposed to each other. The alternative clamp member 100C may also include extension sections 402A-D, similar to clamp member 100A. The alternative clamp member 100C may further include threaded fasteners 408 similar to clamp member 100A.

In a particular embodiment, the base plate 412 may be approximately 5.1875 inches wide, 6.75 inches long, and 0.125 inches thick. An alternative compression plate that is matched to the base plate 412 like the compression plate 100B may be approximately 6.75 inches long and 5.1875 inches wide. The dimensions of the first clamp device show that the first clamp device may be relatively small in sizes compared to commercially available ones. Other thickness may be utilized so that the extensions and base plate may not significantly deform when mounting the antenna to the rail or rails For fabrication, the extension sections and the fasteners may be welded to the base plate such that the first clamp member is an integrated component. The slots in the base plate may be formed by stamping, punching or other means.

Figure 5A:
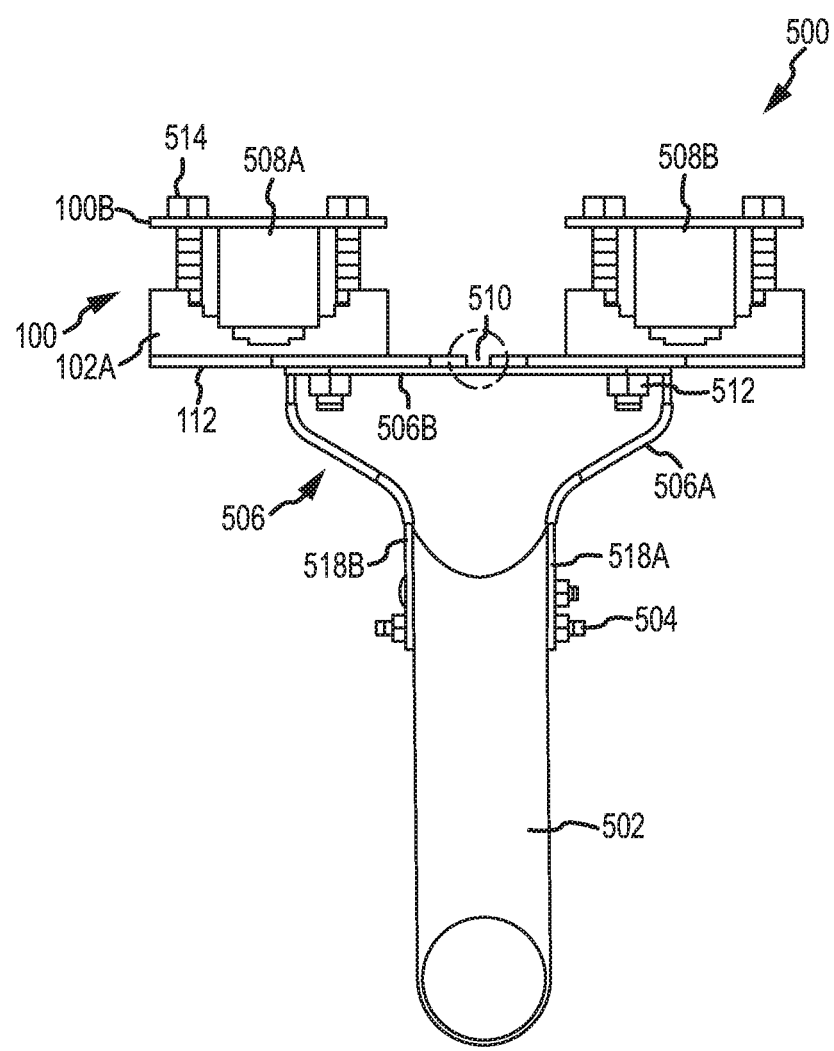
FIG. 5A is a top view of the first clamp device of FIG. 4A with two rails and a footing section for mounting an antenna in an embodiment.
Figure 5B:
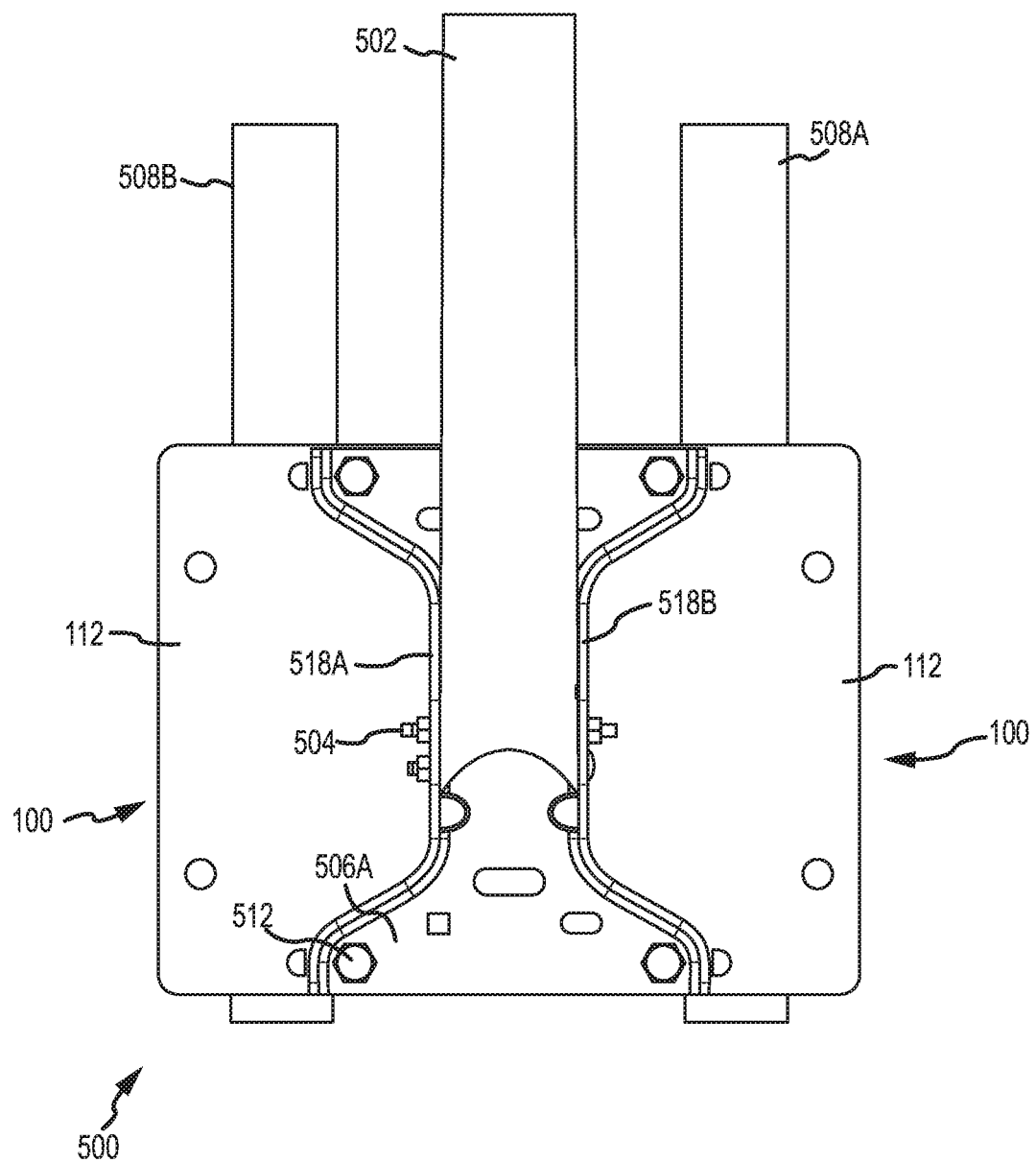
FIG. 5B is a front view of the first clamp device of FIG. 4A with two rails and a footing section for mounting an antenna in an embodiment.

FIG. 5A is a top view of two clamp devices of FIG. 4A assembled with an antenna and two rails in a first embodiment. The assembled system 500 may include two clamp devices 100 with clamp member 100A. The assembled system 500 may also include two rails 508A-B, a foot section 506, and an antenna mast 502. The clamp member 100A of each clamp device 100 is firmly attached to each of rails 508A and 508B. Each compression plate 100B is pressed against the top surface of each of rails 508A-B and is secured by rail fasteners 514. The foot section 506 for mounting the antenna mast 502 may include two curved side panels 506A coupled between a bottom plate 506B and two sidewalls 518A-B, respectively. The curved side panels 506A are configured to bridge the bottom plate 506B and the two sidewalls 518A-B. The two clamp devices 100 are substantially aligned such that the bottom plate 506B is firmly attached to the two base plates 112 of the two clamp device 100 and secured by foot section fasteners 512. There may be a gap 510 between the base plates 112 of the two clamp devices. The antenna mast 502 may be firmly attached to the foot section 506 by antenna fasteners 504.

FIG. 5B is a front view of the two clamp devices assembled with the antenna mast and two rails of FIG. 5A. The antenna mast 502 is oriented upward. Each of the first clamp device 100 is attached to a respective rail 508A or 508B. The two clamp devices 100 are arranged such that the two respective curved edges 110 are opposed to each other. The foot section 506 may be attached to the two slots of the base plate 112 by foot section fasteners 512. The antenna mast may be placed between two side walls 518A-B of the foot section 506 and attached to the two sidewalls 518A-B and secured by antenna fasteners 504.

Figure 6A:
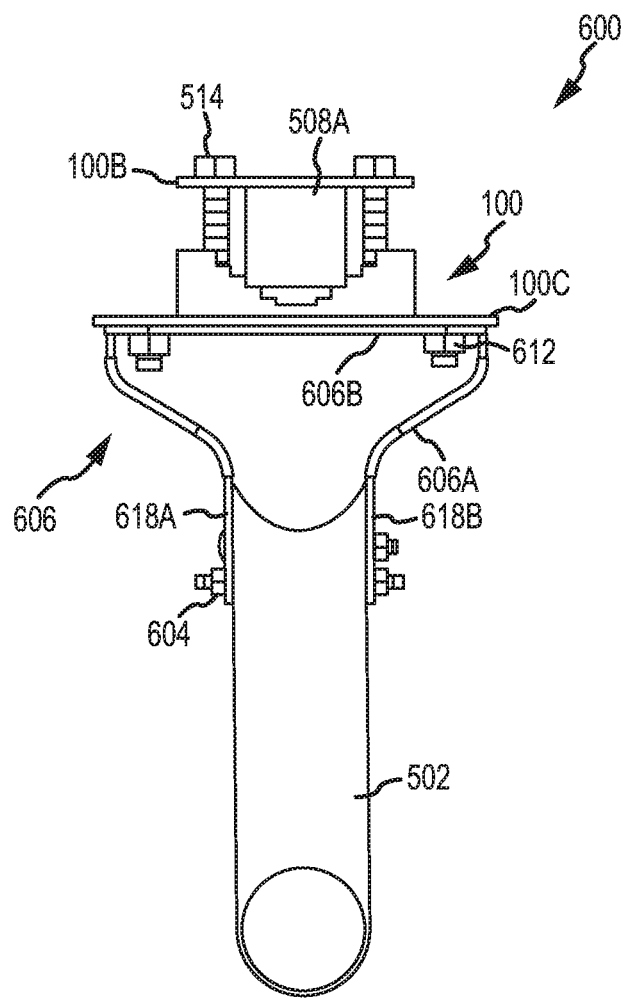
FIG. 6A is a top view of the clamp device of FIG. 4B with a rail and a foot section for mounting an antenna in an embodiment.
Figure 6B:
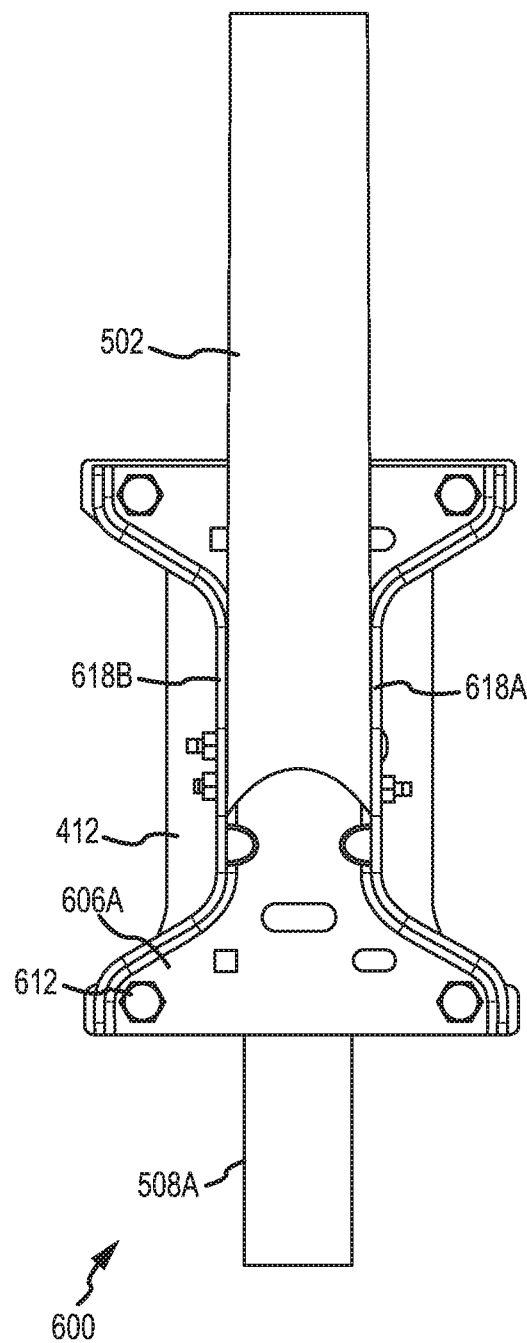
FIG. 6B is a front view of the clamp device of FIG. 4B with a rail and a foot section for mounting an antenna in an embodiment.

FIG. 6A is a top view of a first clamp device of FIG. 4B assembled with an antenna mast/foot and a rail in a second embodiment. An assembled system 600 includes a clamp device 100 with an alternative clamp member 100C, a rail 508A, and a foot section 606 for mounting an antenna 502. The foot section 606 may include two curved side panels 606A coupled between a bottom plate 606B and two sidewalls 618A-B. The bottom plate 606B may be attached to the slots of the base plate 412 by foot section fasteners 612. The antenna mast 502 may be attached to the two sidewalls 618A-B of the foot section 606 by antenna fasteners 604. The rail 508A is secured within the clamp device 100 in the cutout area, pressed by the compression plate 100B, and secured by rail fasteners 514.

FIG. 6B is a front view of the first clamp device assembled with the antenna mast/foot and the rail of FIG. 6A. The antenna mast 502 is also oriented upward. The foot section 606 may be mounted to the four slots (hidden in this view) of the base plate 412 and secured by foot section fasteners 612. The rail 508A may be held to the base plate 412 and the compression plate 100B (hidden in this view). The antenna mast 502 may be attached to the two sidewalls 618A-B of the foot section 606.

Figure 7A:
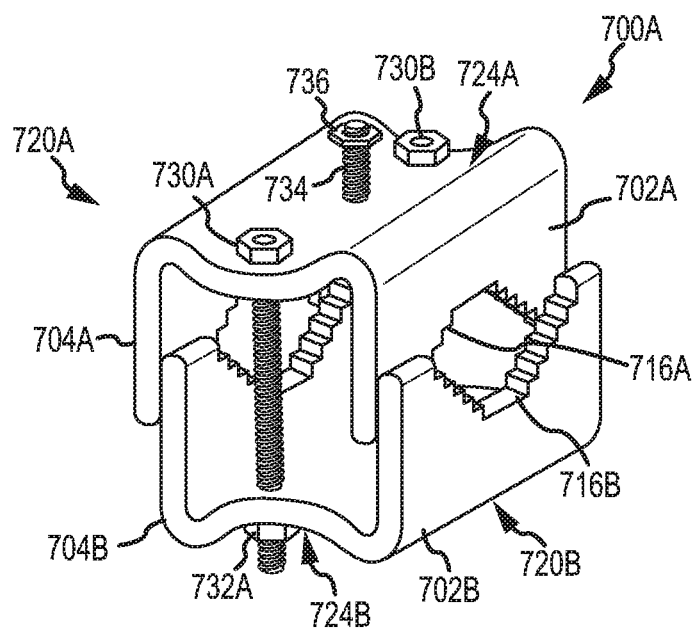
FIG. 7A is a perspective view of a pair of clamp components for a second clamp device in a first assembled configuration in one embodiment.

FIG. 7A is a perspective view of a pair of clamp components of a second clamp device in a first configuration in one embodiment. Configuration 700A may include two clamp components 720A and 720B with a portion of sidewall 704A overlapping with a portion of sidewall 704B, and a portion of sidewall 702A overlapping with a portion of sidewall 702B. As shown, two substantially identical clamp components 720A-720B may be arranged to be opposite to each other. The clamp components may be slightly shifted in an orientation substantially perpendicular to the sidewalls 704A and 704B such that a portion of sidewalls 704A and 702A of the top clamp component 720A overlap and contact a portion of sidewalls 704B and 702B of the bottom clamp component 720B. A rail may be placed in the cutout areas 716A and 716B and held in place by rail fasteners 730A and 730B with matching threaded nuts 732A. A foot section fastener 734 with a matching nut 736 may be used to attach to a foot section for mounting an antenna. The overlap allows the second clamp device to fit to a rail with a relatively small size.

Figure 7B:
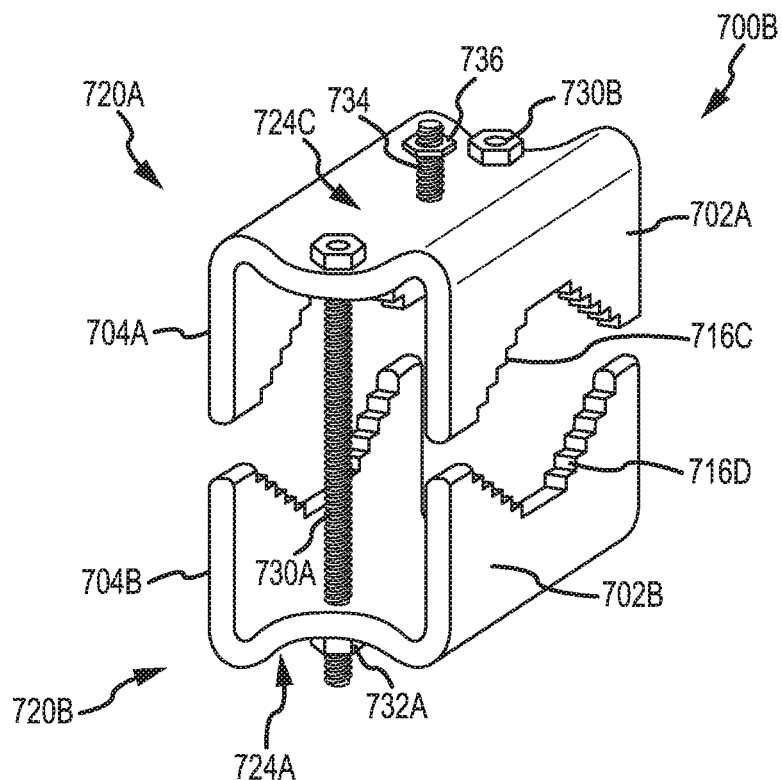
FIG. 7B is a perspective view of a pair of clamp components for a second clamp device in a second assembled configuration in another embodiment.

FIG. 7B is a perspective view of a pair of clamp components of a second clamp device in a second configuration in another embodiment. Configuration 700B may include two clamp components 720A and 720B without any overlapping between sidewall 704A and sidewall 704B or shift in an orientation substantially perpendicular to the sidewalls. Again, two substantially identical clamp components 720A-720B may be arranged to be opposite to each other. In other words, the sidewalls 704A and 702A of the top clamp component 720A may be aligned with the respective sidewalls 704B and 702A of the bottom clamp component 720B. A rail may be placed in the cutout areas 716C and 716D and held in place by rail fasteners 730A and 730B with threaded nuts 732A and 732B (hidden) on middle portion 724A-B that couple the two sidewalls 704A and 702A or sidewalls 704B and 702B. Foot section fasteners 734 and 736 may be used to attach to a foot section for mounting an antenna. Configuration 700B allows to hold to a rail of relatively larger size than configuration 700A.

FIG. 8 is a first side view of the clamp component of FIG. 7A or 7B. As shown, the sidewall 704A has a patterned cutout area 716A in the bottom. The cutout area 716A has a stepped pattern with a number of steps having depths 720A-E and widths 722A-E. The depths and widths vary with the steps. For example, the smallest width 722E is associated with the largest depth 720E. The largest width 722A is associated with the smallest depth 720A.

FIG. 9A is a bottom view of the clamp component of FIG. 7A or 7B. Note that there may be two tabs 902 on two opposite sides of the central through-hole 710C. The holes 710A-B may be elongated along a transverse axis 742 that is substantially perpendicular to a longitudinal axis 740. This elongated holes 710A-B may allow the fasteners to remain straight when the sidewalls 704A, 704B of the clamp components 720A and 720B overlap, as shown in FIG. 7A. The holes 710A-B are arranged on two sides of the central through-hole 710C.

FIG. 9B is a bottom view of the clamp component of FIG. 7A or 7B with a fastener in place. A fastener 730A is placed through the central through-hole 710C. The tabs 902 are arranged such that the fastener 730A may not be turned around.

FIG. 10 is a second side view of the clamp component of FIG. 7A or 7B. The clamp component 720A may include a middle portion 724A having two opposing ends 726A-726B that are coupled to two respective sidewalls 704A and 702A. The middle portion 724A may be configured to have a recess with through-holes arranged along a transverse axis 742 perpendicular to the longitudinal axis 740.

The clamp component 720A may be formed from a sheet metal or another material of sufficient strength to resist flexing and deformation, especially under worse weather conditions, such as strong winds, heavy rains and the like. The sheet metal may first form a patterned cutout area and through-holes by stamping, punching or other means. Then, the patterned sheet metal may be bent to form the curved shape of the middle portion coupled between two sidewalls. Other materials, such as plastic, fiberglass, wood, or composite materials, may be employed in other embodiments.

Figure 11:
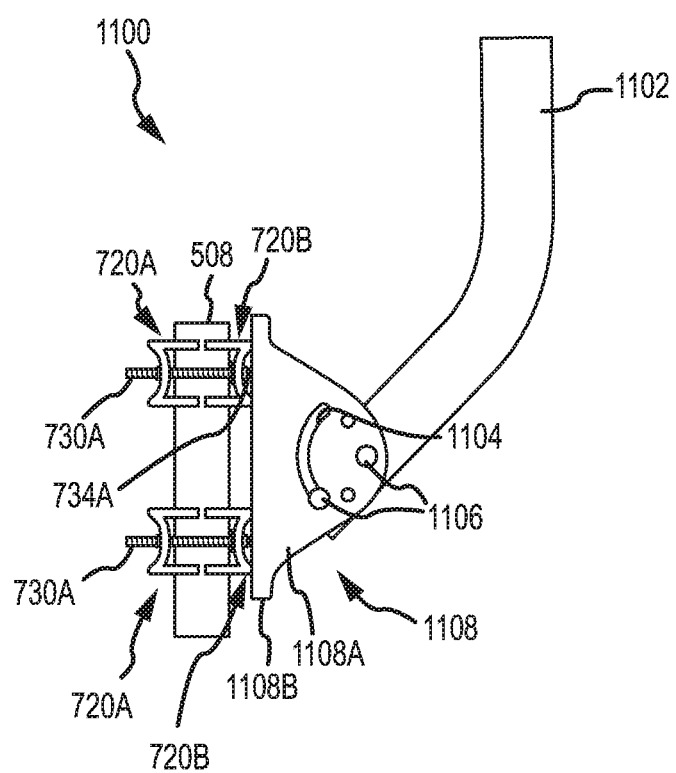
FIG. 11 is a side view of a second clamp device assembled with a rail and a foot section for mounting an antenna in an embodiment.

FIG. 11 is a side view of the second clamp device assembled with a rail and a foot section for mounting an antenna in an embodiment. System 1100 includes a rail 508, an antenna mast 1102 and a foot section 1108 for mounting the antenna mast 1102 to the rail 508, and a second clamp device for attaching to the rail and the foot section. The second clamp device includes a first clamp component 720A on a first side of the rail and a first opposing clamp component 720B on a second opposing side of the rail at a first location along the rail 508. The second clamp device also includes a second clamp component 720A on the first side of the rail and a second opposing clamp component 720B on the second opposing side of the rail at a second location along the rail 508. The clamp components 720A and 720B may be attached to the rail 508 through rail fasteners 730A and threaded nuts 732A. Washers (not shown) may be added. The clamp components 720B are attached to the foot section 1108 by foot section fasteners 734A.

The foot section 1108 may be similar to the one shown in FIGS. 5A and 5B. The foot section 1108 may include a bottom plate 1108B attached to the clamp components 720B that are on the same side of the rail as the foot section 1108. The foot section may also include two side panels 1108A coupled to the bottom plate 1108B. The antenna mast 1102 is attached to the two side panels 1108A. The side panels 1108A may include a slot 1104 for adjusting angle of the antenna mast 1102. The position of the antenna mast 1102 may be secured by antenna fasteners 1106. It will be appreciated by those skilled in the art that additional pairs of second clamp components may be utilized for a relatively larger object or antenna.

Referring to FIG. 9B again, the clamp component 720A may have a length of 4.125 inches along the longitudinal axis 740 and sidewalls with a height of 1.125 inches, and a width of 1.4375 inches along the transverse axis 742.

It will be appreciated by those skilled in the art that dimensions, shapes, number, and configuration or arrangement of extension sections, fasteners, cutout areas, slots, and recess of the middle portion of the clamp component may vary. The pole may vary in shape and dimension. For example, the rail may have a square cross-section, a rectangular cross-section, a circular cross-section among others.

The second clamp device is relatively smaller in size than the first clamp device and thus uses relatively less materials for fabrication. The second clamp device is also flexible for applications. For example, the second clamp device may be used for a rail in both a horizontal orientation and a vertical orientation. Fences may be used as structures for mounting the antenna. For each application, four substantially identical components are used, which may simplify fabrication process and reduce product cost.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for mounting a clamp to a rail, the method comprising:
   obtaining a clamp having a first clamp component and a second clamp component;
      wherein the first clamp component includes a first sidewall and a second sidewall coupled by a first middle portion;
      wherein the first middle portion includes a first inner side and a first outer side;
      the first and second sidewalls each extending from the first inner side of the first middle portion such that the first sidewall is opposed to the second sidewall;
      the first sidewall comprising a first cutout area and the second sidewall comprising a second cutout area;
      the first middle portion comprising a first elongated hole and a second elongated hole, wherein each of the first and second elongated holes are elongated along a transverse direction to a longitudinal axis of the first middle portion;
      wherein the second clamp component includes a third sidewall and a fourth sidewall coupled by a second middle portion;
      wherein the second middle portion includes a second inner side and a second outer side;
      the third and fourth sidewalls each extending from the second inner side of the second middle portion such that the third sidewall is opposed to the fourth sidewall;
      the third sidewall comprising a third cutout area and the fourth sidewall comprising a fourth cutout area;
      the second middle portion comprising a third elongated hole and a fourth elongated hole, wherein each of the third and fourth elongated holes are elongated along a transverse direction to a longitudinal axis of the second middle portion;
   positioning the first clamp component at a first location along a first length of the rail such that each of the first and second cutout areas of the first and second sidewalls are in contact with the rail on the first side of the rail;
   inserting a first fastener, from the first outer side of the first middle portion, into the first elongated hole;
   positioning the second clamp component at a second location of the rail,
      wherein the second location is proximate to the first length of the rail and positioned opposite the first clamp as positioned at the first location, such that the third and fourth cutout areas of the third and fourth sidewalls substantially oppose the first and second cutout areas of the first and second sidewalls when the rail is positioned between the first clamp component and the second clamp component;
      wherein the positioning of the second clamp component comprises:
         in a first configuration, at least a portion of the first sidewall overlaps with a portion of the third sidewall such that the portion the first sidewall is against the portion of the third sidewall when the rail is held between the first and second clamp components, and
         in a second configuration, no portion of the first sidewall overlaps with any portion of the third sidewall and the first sidewall and the third sidewall are aligned in an orientation substantially parallel to the sidewalls and in the same plane when the rail is held between the first and second clamp components;
   inserting the first fastener, from the second inner side of the second middle portion, into the third elongated hole such that a portion of the first fastener extends through the third elongated hole and out of the second outer side of the second middle portion;
   affixing a first nut to the first fastener; and
   tightening the nut until the first clamp component and the second clamp component are secured to the rail.

2. The method of claim 1, wherein the operation of inserting the first fastener, from the first outer side of the first middle portion, into the first elongated hole occurs before the operation of positioning the first clamp component at the first location along the first length of the rail such that each of the first cutout areas of the first and second sidewalls are in contact with the rail on the first side of the rail.

3. The method of claim 1, wherein the operation of affixing the first nut to the first fastener occurs before the operation of positioning the first clamp component at the first location along the first length of the rail such that each of the first cutout areas of the first and second sidewalls are in contact with the rail on the first side of the rail.

4. The method of claim 1, wherein the operation of positioning the second clamp component at a second location of the rail occurs before the operation of inserting the first fastener.

5. The method of claim 1, wherein the first cutout area has a stepped pattern of at least two steps.

6. The method of claim 5, wherein each of the at least two steps has a width and depth, and the width and depth of a first of the at least two steps varies from the width and depth of a second of the at least two steps.

7. The method of claim 5, wherein the second cutout area has a stepped pattern substantially identical to the stepped pattern of the first cutout area.

8. The method of claim 7, wherein the first middle portion includes at least one tab adjacent to a first through-hole such that upon insertion of a third fastener into the first through-hole, rotation of the third fastener is precluded by the at least one tab.

9. The method of claim 8, wherein the first fastener and the third fastener are bolts.

10. The method of claim 1, wherein the first middle portion has a concave shape.

11. The method of claim 1, wherein at the first position of the rail the rail has a square shape.

12. The method of claim 1, comprising:
inserting a second fastener substantially through each of the second elongated hole and the fourth elongated hole;
affixing a second nut to the second fastener; and
tightening the second nut.

13. A method for mounting a clamp to a rail for facilitating the mounting an object to the rail using the clamp, comprising:
obtaining a clamp having a first clamp component and a second clamp component;
wherein the first clamp component includes a first sidewall and a second sidewall coupled by a first middle portion; wherein the first middle portion includes a first inner side and a first outer side;
the first and second sidewalls each extending from the first inner side of the first middle portion such that the first sidewall is opposed to the second sidewall;
the first sidewall comprising a first cutout area and the second sidewall comprising a second cutout area;
the first middle portion comprising a first elongated hole and a second elongated hole;
wherein each of the first and second elongated holes are elongated along a transverse direction to a longitudinal axis of the first middle portion;
wherein the second clamp component includes a third sidewall and a fourth sidewall coupled by a second middle portion; wherein the second middle portion includes a second inner side and a second outer side;
the third and fourth sidewalls each extending from the second inner side of the second middle portion such that the third sidewall is opposed to the fourth sidewall;
the third sidewall comprising a third cutout area and the fourth sidewall comprising a fourth cutout area;
the second middle portion comprising a third elongated hole and a fourth elongated hole, wherein each of the third and fourth elongated holes are elongated along a transverse direction to a longitudinal axis of the second middle portion;
positioning the first clamp component at a first location along a first length of the rail such that each of the first and second cutout areas are in contact with the rail on the first side of the rail;
inserting a first fastener, from the first outer side of the first middle portion, into the first elongated hole;
positioning the second clamp component at a second location of the rail, wherein the second location is proximate to the first length of the rail and positioned opposite the first clamp as positioned at the first location, such that the third and fourth cutout areas substantially oppose the first and second cutout areas when the rail is positioned between the first clamp component and the second clamp component;
wherein the positioning of the second clamp component comprises:
in a first configuration, at least a portion of the first sidewall overlaps with a portion of the third sidewall such that the portion the first sidewall is against the portion of the third sidewall when the rail is held between the first and second clamp components; and
in a second configuration, no portion of the first sidewall overlaps with any portion of the third sidewall and the first sidewall and the third sidewall are aligned in an orientation substantially parallel to the sidewalls and in the same plane when the rail is held between the first and second clamp components;
inserting the first fastener, from the second inner side of the second middle portion, into the third elongated hole such that a portion of the first fastener extends through the third elongated hole and out of the second outer side of the second middle portion;
affixing a first nut to the first fastener;
tightening the nut until the first clamp component and the second clamp component are secured to the rail; and
wherein the first middle portion includes a first through hole in a center of the first middle portion.

14. The method of claim 13, comprising:
inserting a third fastener into the first through-hole; and
attaching a first object to the first clamp component by use of the third fastener.

15. The method of claim 14, wherein the first object is a foot section of a mast for an antenna.

16. A method for mounting an object to a rail, the method comprising:
obtaining a clamp having a first clamp component and a second clamp component; wherein the first clamp component includes a first sidewall coupled to a first middle portion;
the first sidewall extending from an edge of the first middle portion such that the first sidewall is substantially perpendicular to the first middle portion; the first sidewall comprising a cutout area;
the first middle portion comprising a first elongated hole, wherein the first elongated hole is elongated along a transverse direction to a longitudinal axis of the first middle portion;
wherein the second clamp component includes a third sidewall coupled to a second middle portion;
wherein the first middle portion includes a through-hole;
the third sidewall extending from an edge of the second middle portion such that the third sidewall is substantially perpendicular to the second middle portion;
the second middle portion comprising a third elongated hole, wherein the third elongated hole is elongated along a transverse direction to a longitudinal axis of the second middle portion;
positioning the first clamp component at a first location along a first length of the rail such that the first cutout area of the first sidewall contacts the rail on a first side of the rail;
positioning the second clamp component at a second location on a second side of the rail, wherein the second location is proximate to the first length of the rail and positioned opposite the first clamp as positioned at the first location, such that the third sidewall substantially opposes the first cutout area of the first sidewall when the rail is positioned between the first clamp component and the second clamp component;
wherein the positioning of the second clamp component comprises using one of a first configuration and a second configuration, wherein
in the first configuration, at least a portion of the first sidewall overlaps with a portion of the third sidewall such that the portion the first sidewall is against the portion of the third sidewall when the rail is held between the first and second clamp components, and in the second configuration, no portion of the first sidewall overlaps with any portion of the third sidewall and the first sidewall and the third sidewall are aligned in an orientation substantially parallel to the sidewalls and in the same plane when the rail is held between the first and second clamp components;

fastening, using a first fastener, the first middle portion to the second middle portion such that the first clamp component and the second clamp component are secured to the rail; and fastening the object to the clamp by use of the through hole and an object fastener.

17. The method of claim 16, wherein the first cutout area of the first sidewall includes a stepped pattern.

18. The method of claim 16, wherein the third sidewall includes a second cutout area having the stepped pattern.

19. The method of claim 18, wherein each step of the stepped patterns are matched to a rail of different sizes.

20. The method of claim 16, wherein the first middle portion is fastened to the second middle portion using at least one bolt and nut.

* * * * *